United States Patent [19]

Spaman

[11] Patent Number: 4,847,727
[45] Date of Patent: Jul. 11, 1989

[54] MAGNETIC MEMORY DISC PURGE ERASE APPARATUS

[75] Inventor: Donald R. Spaman, Middletown, Conn.

[73] Assignee: Raymond Engineering Inc., Middletown, Conn.

[21] Appl. No.: 941,384

[22] Filed: Dec. 15, 1986

[51] Int. Cl.[4] ............................................. H01F 13/00
[52] U.S. Cl. ..................................................... 361/151
[58] Field of Search ......................... 361/149, 151, 267

[56] References Cited

U.S. PATENT DOCUMENTS 2,975,239  3/1961  Jackson ................................. 361/151
4,462,055  7/1984  Jackson ................................. 361/151
4,539,619  9/1985  Hill ....................................... 361/267
4,551,782  11/1985  Seely et al. ........................... 361/151

FOREIGN PATENT DOCUMENTS 1166269  10/1969  United Kingdom ................ 361/149

Primary Examiner—L. T. Hix
Assistant Examiner—David M. Gray
Attorney, Agent, or Firm—Fishman, Dionne & Cantor

[57] ABSTRACT

A purge erase apparatus is presented to erase information stored on a magnetic disc. A multiplicity of coils are connected in parallel and are arranged around the disc to create a magnetic field having a region of maximum field intensity. When an erase signal is given, the information on the disc will be erased in one or two revolutions of the rotating magnetic disc through the region of maximum field intensity.

24 Claims, 5 Drawing Sheets

MAGNETIC MEMORY DISC PURGE ERASE APPARATUS

BACKGROUND OF THE INVENTION

This invention relates to the field of magnetic memory disc system. More particularly, this invention relates to the field of purge erasure of data stored on a magnetic memory disc.

This invention was conceived in response to a need for apparatus to swiftly (almost instantaneously) and reliably erase highly sensitive data information. Therefore, this invention will be described in connection with the environment and requirement for purge of classified military data. However, it will be understood that the invention is applicable to and has utility for any requirement for quick and reliable erasure of information stored on a magnetic disc.

Magnetic memory discs are used in a wide range of applications where sensitive information is involved. In many military applications, such as, e.g., fighter aircraft, bombers, tactical ground installations, the magnetic memory disc in a memory system may contain classified information. To avoid the capture and loss of such information by an enemy, there is a need to be able to purge, e.g., quickly erase, the classified information in response to a purge signal.

Purge systems proposed or used in the past for memory systems have undesirable features. For example, with magnetic tape memory systems, a typical prior art purge system has used a phosphorous grenade which is activated by a purge erase signal (which, e.g. could be the signal used to activate the ejection seat on a fighter aircraft). Upon receipt of the activation signal the grenade would ignite and burn up the tape. That phosphorus grendate system has drawbacks, not the least of which is the danger of damage to the memory system per se and physical injury to the pilot from unintended actuation of the grenade.

SUMMARY OF THE INVENTION:

The present invention is directed to a safe and effective electromagnetic system for quick and reliable purge erasure of magnetic memory discs. The military requirements for purge erasure are set forth in DOD requirement 5200.28-M. Those requirements include:

(a) erasure of data in less than one (1) second (b) a degree of erasure of data equal to or greater than 90 db below the saturated signal level In addition, other requirements for the system must be met. For example, particularly for avionics applications, the purge erase apparatus must be small, light weight, and operable on low voltage. Also, in some systems it is desirable to avoid the use of apparatus which will significantly alter the center of gravity of the memory system. So, while a large, heavy and high power erase coil surrounding the entire memory disc would be an obvious way to erase the disc, that solution to the problem is not acceptable.

Thus, when attention was turned to the task of developing a suitable purge mechanism for magnetic memory disc, it was not believed that an erase coil would work within the constraints of a system intended for aerospace applications; and the fact that the present invention has resulted in a suitable purge erase coil system in an unexpected result.

In accordance with the present invention, a purge erase coil apparatus of multiple coils connected in parallel is wound around the cradle which supports the disc cartridge unit. The purge erase-coil apparatus is positioned to be in alignment with or overlap only a part of the magnetic memory disc. The purge erase coil apparatus, when powered by a 115 volt RMS voltage source, establishes a zone of maximum magnetic field intensity. This zone of maximum intensity intersects the plane of the rotating magnetic disc. Each point on the disc passes through the plane of maximum field intensity in one revolution of the disc. For a disc rotating at 3750 RPM, one revolution requires 0.016 sec, and each point on the disc will pass twice through the zone of maximum field intensity and be erased within 0.032 seconds.

BRIEF DESCRIPTION OF THE DRAWINGS:

Referring now to the drawings, wherein like elements are numbered alike in the several Figures;

FIGS. 4–8 present graphs of information generated in a test, of the purge erase system.

DESCRIPTION OF THE PREFERRED EMBODIMENT

By way of example, the purge erase apparatus of the present invention may be employed with magnetic memory disc system such as shown in U.S. patent application Ser. No. 821,101 (abandoned in favor of U.S. application Ser. No. 096,978 filed Sept. 14, 1987, now U.S. Pat. No. 4,791,508, all of the contents of which are incorporated herein by reference), and U.S. patent application Ser. No. 941,820 filed Dec. 15, 1986 which is a continuation-in-part of application Ser. No. 821,101 (and which is being filed contemporaneously herewith).

Figure 1:
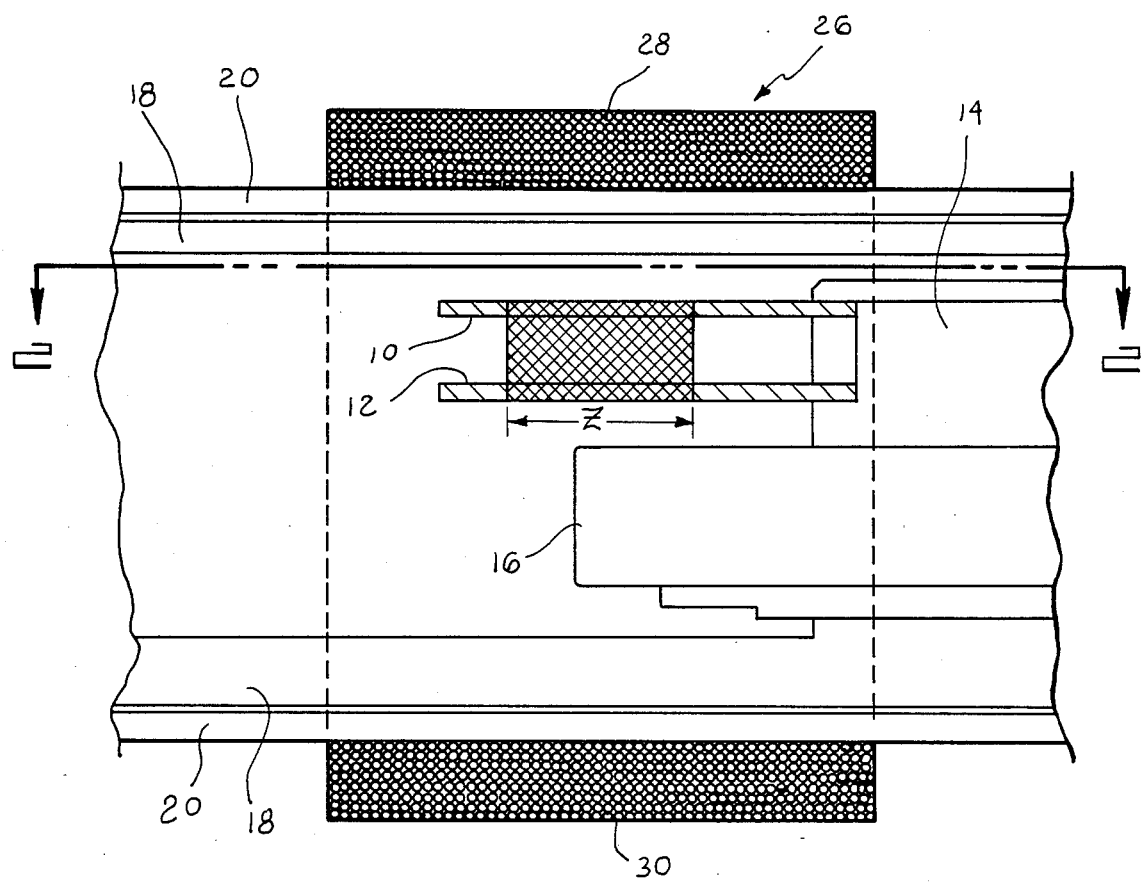
FIG. 1 is a sectional elevation view of the purge coil apparatus of the present invention.
Figure 2:
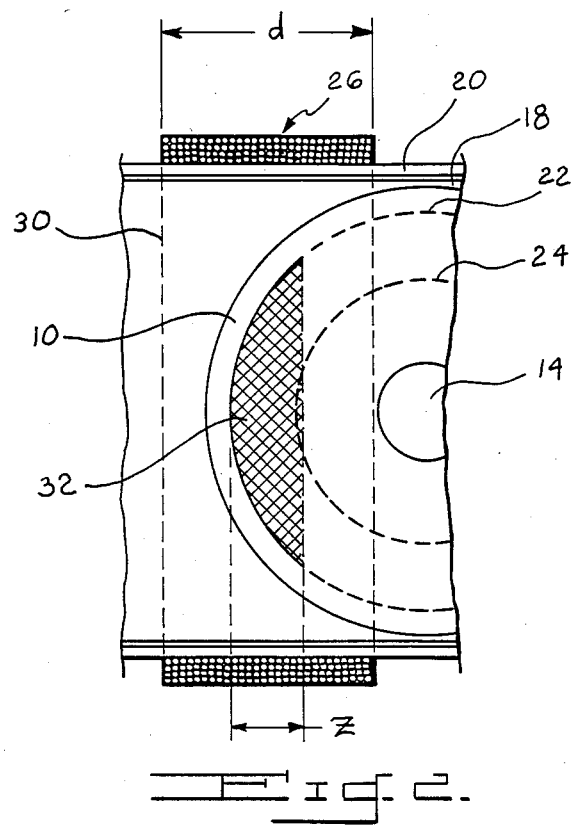
FIG. 2 is a plan view taken along line 2—2 of FIG. 1.

Referring jointly to FIGS. 1 and 2, magnetic memory discs 10 and 12 are mounted on a rotary table 14 which, in turn, is driven by a rotary motor 16. Discs 10 and 12 and table 14 are aluminum; motor 16 is steel. The rotating discs, table and motor are contained within an aluminum support cradle 20. It will be understood that read/write apparatus and other apparatus are employed in assocation with the magnetic discs 10 and 12 to constitute a total system.

Figure 3:
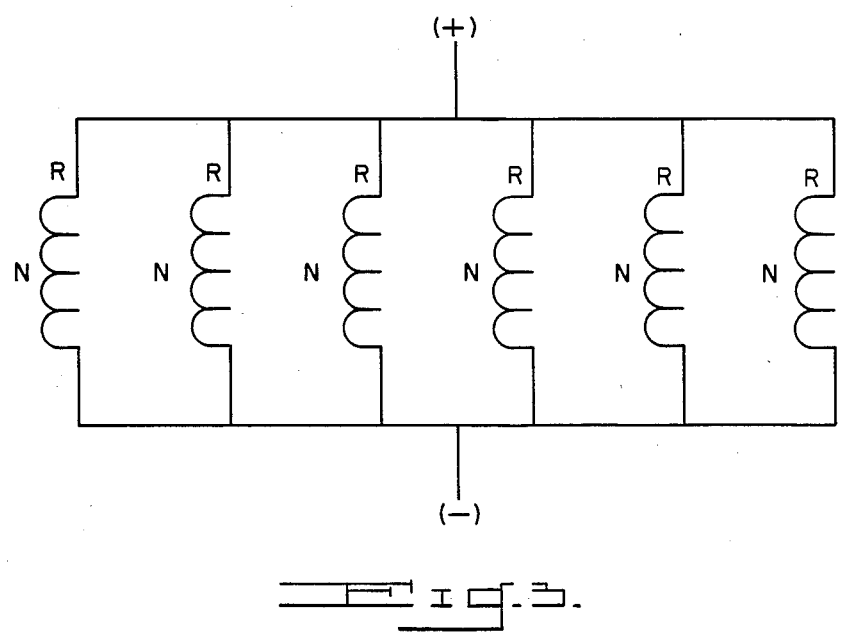
FIG. 3 is an electrical schematic of the purge erase coil of the present invention.

For example, referring to U.S. Pat. No. 4,791,508 (the contents of which have been incorporated herein by reference), FIGS. 2 and 3 depict a magnetic disc memory system 10 employing a read/write head mechanism 46 which is mounted on a movable head carriage 54 in a housing 10. Read/write head mechanism 46 cooperates with a magnetic disc 24 during normal operation of the magnetic memory system 10 to read and write data to and from the magnetic disc 24.

Discs 10 and 12 each have an information band defined by an outer information track 22 and an inner information track 24, and all of the information stored on the disc is contained in the band between tracks 22 and 24. Of course, it will be understood that the top and bottom surfaces of discs 10 and 12 may have such information bands.

A purge erase coil assembly 26 is located around cradle 20 and is connected to a source of 115V, 50 H$_z$ to 400 H$_z$ power (not shown). It is to be especially noted that coil assembly 26 is positioned off center with respect to the axis of rotation of discs 10 and 12 and extends across only a segment of the discs 10 and 12, and the present invention relies on rotation of the disc for the interaction between the magnetic field established by the coil and the rotation of the disc to effect complete erasure. This means that the coil can be kept small, extending over a distance "d" of approximately 50% of the disc diameter. In one reduction to practice the coil width "d" is about 1.8 inches in a system in which the disc diameter is 3.5 inches. This contributes to the important goal in avionics of conserving space and weight.

Referring to FIG. 3, an electrical schematic is shown of coil 26. The coil assembly is made up of a number of coils (six in this particular case) connected in parallel. Each of the six coils have N windings or turns around the cradle assembly and each coil has a resistance R. The field generated by this coil assembly is 6NI, while the equivalent resistance is R/6. Thus, as opposed to a single series wound coil with the same number of turns as the arrangement of the multiple coils connected in parallel (i.e., 6 N turns in the example), the present invention achieves the same field strength (i.e., as in a series wound coil) with 1/6 the voltage requirement. Therefore, by using the array of multiple coils connected in parallel, a smaller power source is required, and the present invention can get the desired field strength with small diameter wire, thus making it possible to achieve a smaller unit spacewise (because the packability of small diameter wire of approximately 27 gage makes it possible to achieve a relatively flat coil assembly 26 wound around the cradle) than with a series wound unit. Once again, the smaller power source and smaller space requirements are of great importance and advantage for avionics applications. Other parallel series combinations of coils may be required in other embodiments to maximize flux density depending on voltage sources available.

When powered (such as by the signal to activate an ejection seat in a fighter aircraft), coil 26 establishes an alternating magnetic field. Since current is flowing perpendicular to the plane of the paper in FIG. 1 and parallel to the plane of the paper in FIG. 2, a magnetic field is established between the upper and lower coil sections, with a zone of maximum field intensity existing between sections 28 and 30 about mid way between the ends thereof. That zone of maximum field intensity is indicated at Z in FIGS. 1 and 2, and the area or volume of intersection of the discs 10 and 12 with that zone of maximum field intensity is indicated by the shaded areas 32 in FIGS. 1 and 2.

Coil assembly 26 is positioned relative to discs 10 and 12 so that the zone 32 of maximum field intensity overlaps the entirety of the information band between outer track 22 and inner track 24 along an arc length of the discs 10 and 12. Thus, any point within the information band will pass through the maximum field zone once in one revolution of the disc and twice in two revolutions of the disc.

For a system operating at 3750 RPM, complete erasure is accomplished in two (2) revolutions of the disc, which requires an elapsed time of 0.032 seconds. Complete erasure is defined as erasure of data equal to or greater than 90 db below the saturated signal level of data stored on the disc.

It is particularly important to note that both discs have information on both sides of each disc, and both sides of both discs are completely erased in the same two revolutions through the zone of maximum field intensity. This was an unexpected result.

EXAMPLE

In a particular embodiment of a magnetic memory disc system, magnetic discs are employed having an average coercevity of 750 Oe to 850 Oe. A one megaherz square wave was recorded on a disc 10 by read/write circuitry in the information band at approximately three quarters the radius from the center of the disc. A magnetic field strength greater than 850 Gauss is required to change the magnetic domains of this material. To insure erasure of the 1 MHz square wave signal a field strength of 2000 Gauss was established in zone 32 for the erasure operation. The read signal received from the disc was amplified via a Tektronix Model P6046 Differential Probe and connected to a Hewlett-Packard Model 3585A Spectrum Analyzer and a Tektronix Model 466 Storage Oscilloscope for evaluation.

Figure 4:
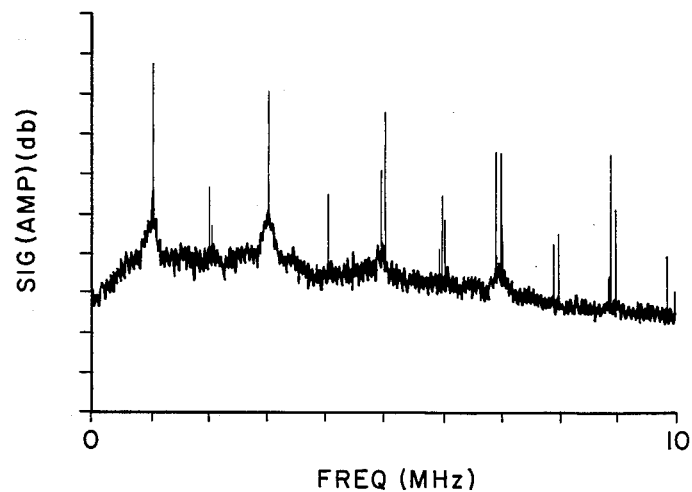
Figure 5:
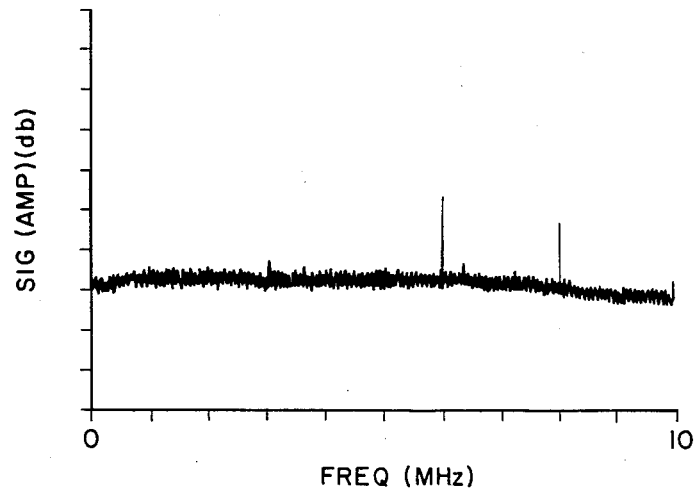
Figure 6:
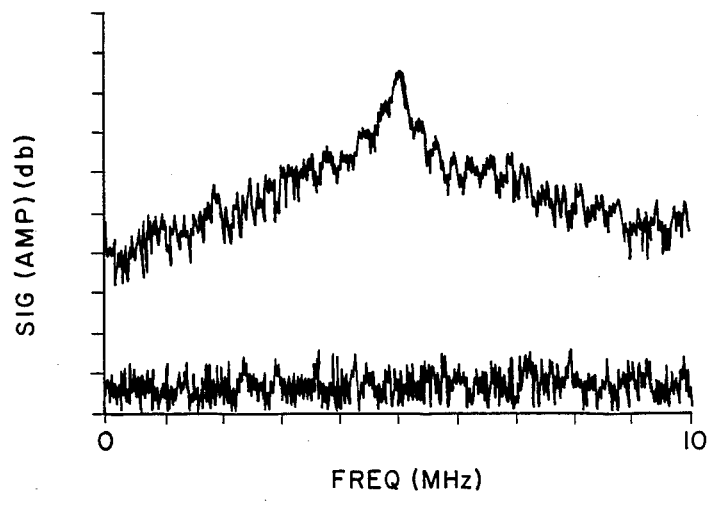
Figure 7:
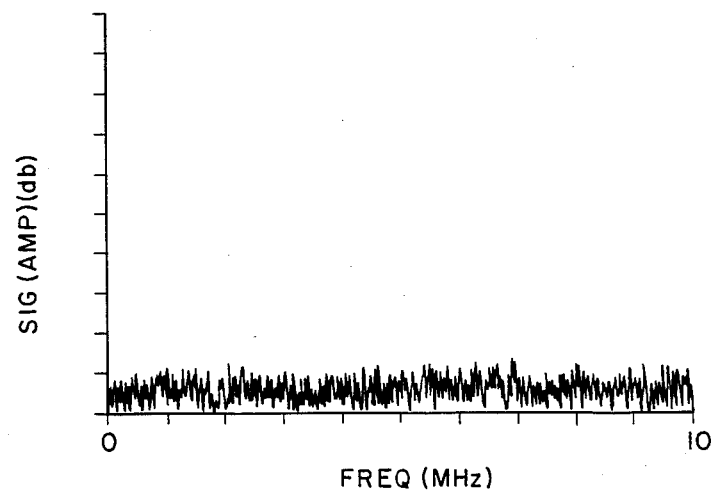
Figure 6:
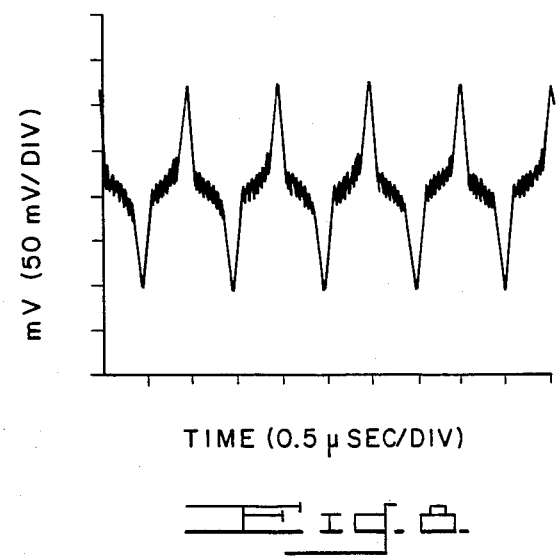

FIGS. 4 and 5 illustrate a 10 MHz spectrum analysis of the write/read and purge operations. FIG. 4 illustrates the spectrum of the read signal resulting from the write operation. FIG. 5 illustrates the spectrum of the read signal after purge. FIGS. 6 and 7 illustrate a narrow bandwidth (10 Hz Resolution) analysis of the write/read and purge operation. FIG. 6 illustrates a 2 KHz spectrum around the 1 MHz recorded data frequency. The top trace is the read signal spectrum after the write operation; the bottom trace is the read signal spectrum after the purge operation. FIG. 7 illustrates the dynamic range of the spectrum analyzer, including R/W hybrid, R/W head and virgin magnetic disc noise, at a center frequency of 1 MHz.

FIG. 4 indicates that a robust data signal has been recorded on the magnetic disc. This is further verified by FIG. 8, which is an oscilloscope display of the read signal available at the output of the read/write unit. After the purge operation, the 1 MHz fundamental frequency was below the wideband 56.2 db noise level as indicated by the offset reading on FIG. 5. All odd harmonics of the fundamental frequency have also been reduced below this noise level.

A narrowband analysis of the effectiveness of the purge operation is illustrated in FIG. 6. This photograph indicates that the 1 MHz fundamental frequency was below the narrowband noise level 87.3 db after the purge operation (10 Hz Resolution Bandwidth). The noise level of the read/write apparatus and virgin magnetic disc is 87.5 db below the 1 MHz fundamental signal level as illustrated in FIG. 7.

The test results show that the purge apparatus is effective in erasing information stored on the disc in accordance with the requirements of Section VIII, Specifications for Magnetic Tape Erase Equipment, of D.O.D. Document 5200.28-M. That document, suggests that the residual signal level after erasure of a 400 Hz signal from magnetic tape be 90 db below its saturated signal level. As the disc memory system operates at a higher frequency and requires greater bandwidth for reliable operation, the narrowband residual noise cannot be reduced below 87.3 db. Since no discernable signal could be detected in this background noise level, this unmeasurable residual signal level compares very favorably with the residual signal level specified in the above noted document.

While preferred embodiments have been shown and described various modifications and substitutions may be made thereto without departing from the spirit and scope of the invention. Accordingly, it is to be understood that the present invention has been described by way of illustrations and not limitation.

What is claimed is:

1. A magnetic memory disc system having read, write and purge erase capability, the system including:
   at least one magnetic memory disc mounted for rotary movement on a rotary table;
   said memory disc having an information bearing band thereon;
   housing means for said memory disc and rotary table;
   read/write means in said housing means for normal operation of said magnetic memory system;
   purge erase coil means mounted around said housing means and encircling a part of said magnetic memory disc to establish a magnetic field when connected to a source of electrical power to erase information on said memory disc during rotation of said magnetic memory disc in said magnetic memory system; and
   said purge erase coil means being positioned relative to said memory disc to define a zone of maximum magnetic field intensity which intersects and overlaps the entirety of said information bearing band along an arc length of said disc to effectively erase all information on said disc in not more than two revolutions of said disc through said zone of maximum field intensity.

2. A magnetic memory disc system as in claim 1 including:
   at least two magnetic memory discs mounted coaxially and in parallel and spaced apart relationship; and
   each of said discs having at least one information bearing band thereon, said bands being in alignment, said purge erase coil means being positioned relative to both of said memory discs whereby said zone of maximum field intensity will overlap and intersect the entirety of each of said information bearing bands along an arc length of each disc to effectively erase all information on said discs in not more than two revolutions of each disc through said zone of maximum field intensity.

3. A magnetic memory disc system as in claim 2 wherein:
   each of said magnetic memory discs has first and second aligned information bands on opposed sides of said disc, said purge erase coil means being positioned relative to both of said memory discs whereby said zone of maximum field intensity will overlap and intersect the entirety of each of said information bearing bands along an arc length of each disc to effectively erase all information on said discs in not more than two revolutions of each disc through said zone of maximum field intensity.

4. A magnetic memory disc system as in claim 3 wherein:
   said purge erase coil means is positioned off center with respect to the axis of rotation of said discs and extends along the direction of offset for a distance not greater than 50% of the diameter of said discs.

5. A magnetic memory disc system as in claim 1 wherein:
   said purge erase coil means is positioned off center with respect to the axis of rotation of said disc and extends along the direction of offset for a distance not greater than 50% of the diameter of said disc.

6. A magnetic memory disc system as in claim 1 wherein:
   said disc is erased to at least 90 db below the saturated signal level of data stored on said disc.

7. A magnetic disc system having read, write and purge erase capability, the system including:
   at least one magnetic memory disc mounted for rotary movement on a rotary table;
   said memory disc having an information bearing band thereon;
   casing means for said rotary table and memory disc;
   read/write means in said casing means for normal operation of said magnetic memory system;
   cradle means in which said casing means is mounted for operation;
   purge erase coil means positioned around said cradle means and encircling a part of said magnetic memory disc to establish a magnetic field when connected to a source of electrical power to erase information on said disc during rotation of said magnetic memory disc in said magnetic memory system; and
   said purge erase coil means being positioned relative to said memory disc to define a zone of maximum field intensity which intersects and overlaps the entirety of said information bearing band along an arc length of said disc to effectively erase all information on said disc in not more than two revolutions of said disc through said zone of maximum field intensity.

8. A magnetic memory disc system as in claim 7 including:
   at least two magnetic memory discs mounted coaxially and in parallel and spaced apart relationship; and
   each of said discs having at least one information bearing band thereon, said bands being in alignment, said purge erase coil means being positioned relative to both of said memory discs whereby said zone of maximum field intensity will overlap and intersect the entirety of each of said information bearing bands along an arc length of each disc to effectively erase all information on said discs in not more than two revolutions of each disc through said zone of maximum field intensity.

9. A magnetic memory disc system as in claim 8 wherein:
   each of said magnetic memory discs has first and second aligned information bands on opposed sides of said disc, said purge erase coil means being positioned relative to both of said memory discs whereby said zone of maximum field intensity will overlap and intersect the entirety of each of said information bearing bands along an arc length of each disc to effectively erase all information on said discs in not more than two revolutions of each disc through said zone of maximum field intensity.

10. A magnetic memory disc system as in claim 9 wherein:
    said purge erase coil means is positioned off center with respect to the axis of rotation of said discs and extends along the direction of offset for a distance not greater than 50% of the diameter of said discs.

11. A magnetic memory disc system as in claim 7 wherein:
    said purge erase coil means is positioned off center with respect to the axis of rotation of said disc and extends along the direction of offset for a distance not greater than 50% of the diameter of said disc.

12. A magnetic memory disc system as in claim 7 wherein:
said disc is erased to at least 90 db below the saturated signal level of data stored on said disc.

13. A magnetic memory disc system as in claim 1 wherein:
said purge erase coil means include a plurality of coils connected in parallel.

14. A magnetic memory disc system as in claim 1 wherein:
said purge erase coil means includes a coil assembly of a plurality (P) of coils of N windings each connected in parallel to establish a field of PNI and a coil assembly equivalent resistance of R/P, where P = the number of coils, N = the number of windings or turns of each coil, I = the current, and R = equivalent resistance.

15. A magnetic memory disc system as in claim 7 wherein:
said purge erase coil means include a plurality of coils connected in parallel.

16. A magnetic memory disc system as in claim 7 wherein:
said purge erase coil means includes a coil assembly of a plurality (P) of coils of N windings each connected in parallel to establish a field of PNI and a coil assembly equivalent resistance of R/P, where P = the number of coils, N = the number of windings or turns of each coil, I = the current, and R = equivalent resistance.

17. A magnetic memory unit having read, write and purge erase capability, the unit including:
at least one magnetic memory element mounted for rotary movement on a rotary table;
said memory element having an information bearing part thereon;
housing means for said memory element and rotary table;
read/write means in said housing means for normal operation of said magnetic memory unit;
purge erase coil means mounted around said housing means and encircling a part of said magnetic memory element to establish a magnetic field when connected to a source of electrical power to erase information on said memory element during rotation of said magnetic memory element in said magnetic memory unit; and
said purge erase coil means being positioned relative to said memory element to define a zone of maximum magnetic field intensity which intersects and overlaps the entirety of said information bearing part along an arc length of said memory element to effectively erase all information on said memory element in not more than two revolutions of said element through said zone of maximum field intensity.

18. A magnetic memory unit as in claim 17 including:
at least two magnetic memory elements rotatably mounted in parallel and spaced apart relationship; and
each of said memory elements having at least one information bearing part thereon, said purge erase coil means being positioned relative to both of said memory elements whereby said zone of maximum field intensity will overlap and intersect the entirety of each of said information bearing parts along an arc length of each memory element to effectively erase all information on said memory elements in not more than two revolutions of each memory element through said zone of maximum field intensity.

19. A magnetic memory unit as in claim 17 wherein:
said purge erase coil means include a plurality of coils connected in parallel.

20. A magnetic memory unit as in claim 17 wherein:
said purge erase coil means includes a coil assembly of a plurality (P) of coils of N windings each connected in parallel to establish a field of PNI and a coil assembly equivalent resistance of R/P, where P = the number of coils, N = the number of windings or turns of each coil, I = the current, and R = equivalent resistance.

21. A magnetic memory system having read, write and purge erase capability, the system including:
at least one magnetic memory element mounted for rotary movement on a rotary table;
said memory element having an information bearing part thereon;
casing means for said rotary table and memory element;
read/write means in said casing means for normal operation of said magnetic memory system;
cradle means in which said casing means is mounted for operation;
purge erase coil means positioned around said cradle means and encircling a part of said magnetic memory element to establish a magnetic field when connected to a source of electrical power to erase information on said memory element during rotation of said magnetic memory element in said magnetic memory system; and
said purge erase coil means being positioned relative to said memory element to define a zone of maximum field intensity which intersects and overlaps the entirety of said information bearing part along an arc length of said memory element to effectively erase all information on said memory element in not more than two revolutions of said disc through said zone of maximum field intensity.

22. A magnetic memory system as in claim 21 including:
at least two magnetic memory elements rotatably mounted in parallel and spaced apart relationship; and
each of said memory elements having at least one information bearing part thereon, said purge erase coil means being positioned relative to both of said memory elements whereby said zone of maximum field intensity will overlap and intersect the entirety of each of said information bearing parts along an arc length of each memory element to effectively erase all information on said memory elements in not more than two revolutions of each disc through said zone of maximum field intensity.

23. A magnetic memory system as in claim 21 wherein:
said purge erase coil means include a plurality of coils connected in parallel.

24. A magnetic memory system as in claim 21 wherein:
said purge erase coil means includes a coil assembly of a plurality (P) of coils of N windings each connected in parallel to establish a field of PNI and a coil assembly equivalent resistance of R/P, where P = the number of coils, N = the number of windings or turns of each coil, I = the current, and R = equivalent resistance.

* * * * *